United States Patent
Cormier

[15] 3,653,016
[45] Mar. 28, 1972

[54] COMBINATION VISIBLE LIGHT DETECTOR AND ULTRAVIOLET DETECTOR COACTING AS A FIRE DISCRIMINATION SYSTEM

[72] Inventor: Arthur R. Cormier, Uxbridge, Mass.
[73] Assignee: The United States of America as represented by the Secretary of the Air Force
[22] Filed: Sept. 9, 1970
[21] Appl. No.: 70,705

[52] U.S. Cl. ..............................340/228, 321/49, 325/492, 250/83.3 UV
[51] Int. Cl. ........................................................G08b 17/12
[58] Field of Search............340/228; 250/83.3 UV, 83.3 HP, 250/203; 321/8, 49; 325/492

[56] References Cited

UNITED STATES PATENTS

| | | | |
|---|---|---|---|
| 3,544,792 | 12/1970 | Giltaire | 340/228 S X |
| 3,122,638 | 2/1964 | Steele et al. | 340/228 UX |
| 3,246,309 | 4/1966 | Gasch, Jr. | 321/49 X |

Primary Examiner—John W. Caldwell
Assistant Examiner—William M. Wannisky
Attorney—Harry A. Herbert, Jr. and George Fine

[57] ABSTRACT

A combination visible light and ultraviolet flame detector is provided wherein a broad band solar cell senses the presence of a visible light source in a surveyed area, and a coacting ultraviolet detector confirms or negates the presence of any ultraviolet component in the visible light, thereby indicating whether the response signifies occurrence of fire, explosion, or merely a false alarm.

1 Claims, 1 Drawing Figure

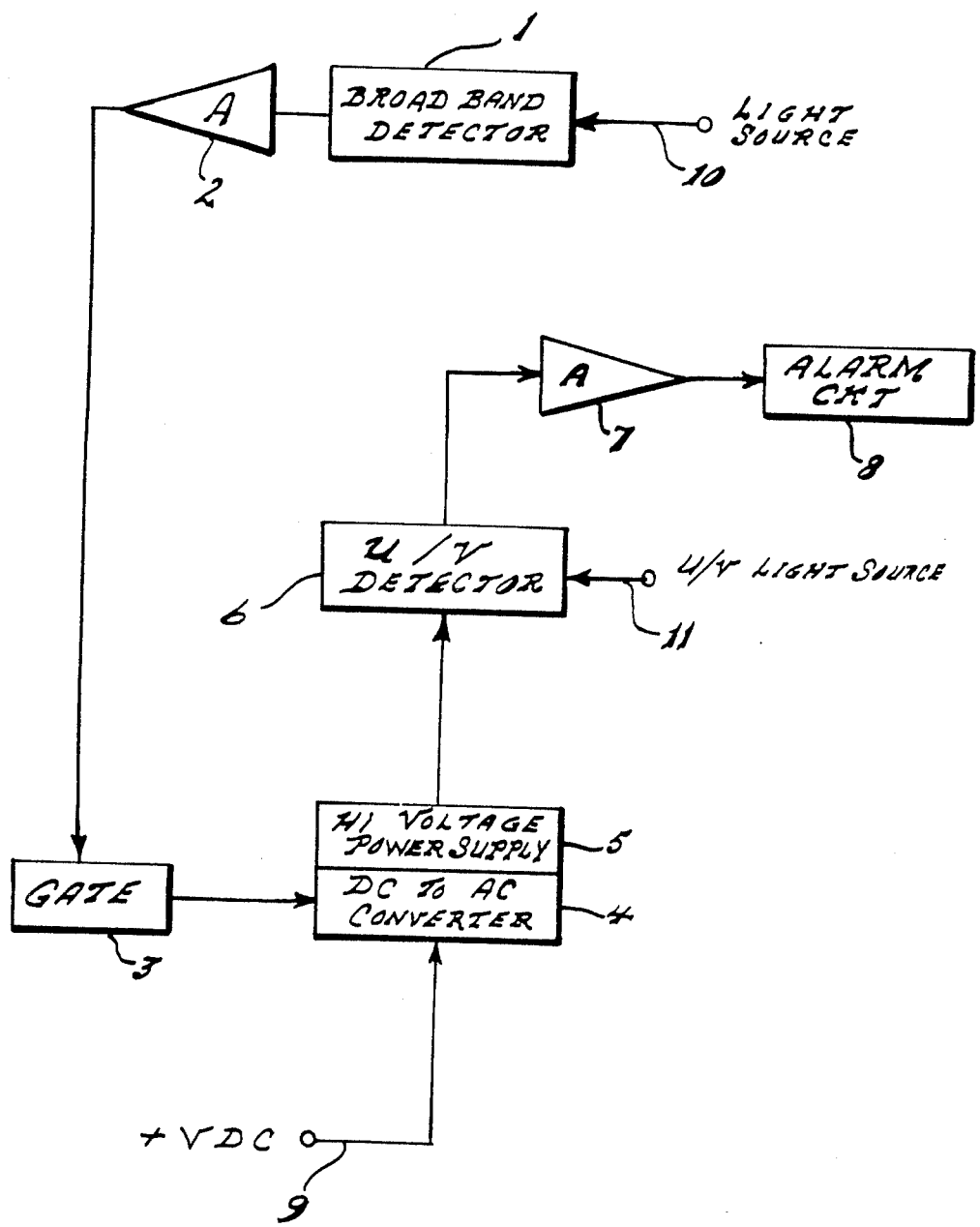

COMBINATION VISIBLE LIGHT DETECTOR AND ULTRAVIOLET DETECTOR COACTING AS A FIRE DISCRIMINATION SYSTEM

BACKGROUND OF THE INVENTION

The present invention relates to a flame detector, and more particularly to a flame detector discriminating flame from visible light.

Electrical systems for indicating when a condition under observation has achieved a predetermined state utilize a transducer to translate the presence of the condition into an electrical signal. In some instances, when the existence of flame or explosion is to be detected there is also present visible light. It is particularly difficult, in the presence of visible light, to achieve an effective detecting system for flame or explosion since the visible light would be translated into an electrical signal in spite of the lack of flame or explosion. In the prior art there does not exist a simple, effective detection system to discriminate in the presence of both visible light and flame, or explosion.

It is well known that flame or explosion will result in the type of radiation that will result in ultraviolet emission. This is particularly true in flame or explosion involving high temperatures.

The present invention, in sharp contrast to the prior art, utilizes a pair of transducers, one exclusively for visible light and the other for ultraviolet. The pair of transducers are arranged to survey the identical area and coact so as to provide a unique detection system permitting a discrimination to occur between visible light and ultraviolet thereby providing a simple effective detector system.

SUMMARY OF THE INVENTION

A combination visible light and ultraviolet detector system is provided. A broad band detector is employed to sense the presence of a visible light source in the area under surveillance, and an ultraviolet detector confirms or denies the validity of the existence of ultraviolet in the source of light. Should only visible light enter the region under surveillance, the ultraviolet detector sensitive to light solely in the 2,300 A. region assumes a no-fire condition.

An object of the invention is to provide a two detector high temperature ultraviolet fire discrimination system.

Another object of the invention is to provide a visible light detector in combination with an ultraviolet detector both surveying the identical area, one sensing the presence of visible light and the other confirming or denying the presence of an ultraviolet component in the surveying visible light.

Still another object of the invention is to provide a fire detection system combining an ultraviolet detector and a broad band solar cell detector to minimize false alarms and to provide high temperature capability.

These and other advantages, features and objects of the invention will become more apparent from the following description taken in connection with the illustrative embodiment in the accompanying drawing.

DESCRIPTION OF THE DRAWING

A preferred embodiment of the invention is shown in block diagram form.

DETAILED DESCRIPTION OF THE PREFERRED EMBODIMENT

Now referring in detail to the single FIGURE of the invention, there is shown broad band solar cell detector 1 and ultraviolet detector 6 both arranged and positioned to keep under surveillance the identical area. Broad band solar cell detector 1 is employed to sense in the area under surveillance the presence of visible light source 10. Visible light source 10 may result from fire, or explosion, et cetera. Detector 1 is a transducer with the capability of transforming visible light into the representative electrical signal which is then passed through amplifier 2 and received at the input of gate 3. Gate 3 is arranged to provide a gating output pulse upon the reception of an actuating signal from amplifier 2.

DC to AC converter 4 and high voltage power supply 5 develop the high voltage for ultraviolet detector 6 and is energized only when "gated on" by an output signal from broad band solar cell detector 1. DC to AC converter 4 receives a DC voltage from terminal 9. This gating technique provides the advantage of time sharing the "on power" of the converter to the periods when broad band light impinges on detector 1. This technique reduces the average power dissipation of all the components in the system and hence provides greater reliability and larger component life.

In addition, the limited "on time" of the electronics provides a reduction of cooling requirements should the system be subjected to elevated temperatures. The cooling, in this case, may be passive and limited to a covering of material possessing a low coefficient of thermal conductivity.

When the converter is energized upon being "gated on", high voltage supply 5 delivers an actuating voltage to ultaviolet detector 6. Thereupon detector 6, in the presence of ultraviolet light source 11, will provide a representative electrical output signal which is passed through amplifier 7 to actuate alarm circuit 8 thus indicating the presence of an ultraviolet signal. Alarm circuit 8 is conventional and may be in the form of a visible, audible, or computer signal. It is emphasized again that broad band solar cell detector 1 and ultraviolet detector 6 are arranged to survey the identical area. In this arrangement, detector 1 senses the presence of a source of visible light and detector 6 confirms or denies the validity of existence of an ultraviolet component in the source of visible light. Should only visible light enter the area under surveillance, the ultraviolet detector, sensitive in this instance to light solely in the 2,300 A. region, would assume a no-fire condition. Thus the present invention includes a broad band solar cell detector which senses the presence of a visible light source in a surveyed area, and a coacting ultraviolet detector confirms or negates the presence of any ultraviolet component in the visible light, thereby indicating whether the response signifies occurrence of fire, or explosion, or merely a false alarm.

What is claimed is;

1. A combination visible light detector and ultraviolet detector coacting as a fire and explosion discrimination system for a preselected area under surveillance comprising a broad band solar cell detector permanently operative, an ultraviolet detector normally inoperative and becoming operative upon the receipt of a preselected high AC voltage, said broad band solar cell detector and said ultraviolet detector being physically and electrically positioned to simultaneously survey said preselected area, said broad band solar cell detector upon sensing visible light characteristic of flame and explosion emanating from said preselected area providing a first electrical signal, means to generate a gating signal upon receipt of said first electrical signal, a DC to AC converter arranged to be energized upon receipt of said gating signal to provide an AC output voltage therefrom, said DC to AC converter also receiving a DC input voltage, means to generate said preselected high AC voltage for said ultraviolet detector upon said receipt of said AC output voltage, said ultraviolet detector upon becoming operative detecting the presence of any ultraviolet component in the sensed visible light characteristic of flame and explosion to provide a second electrical signal, and an alarm circuit becoming operative upon the receipt of said second electrical signal.

* * * * *